United States Patent [19]
Chadwick et al.

[11] Patent Number: 6,005,891
[45] Date of Patent: Dec. 21, 1999

[54] SYSTEM FOR TESTING SIGNAL TRANSMISSION/RECEPTION APPARATUS

[76] Inventors: Raymond B. Chadwick, 862 Devon St., Kearny, N.J. 07032; James Bush, 601 N. Umberland Way, Monmouth Junction, N.J. 08852; Timothy Przygoda, 60 Old Turkey Swamp Rd, Freehold, N.J. 07728; Boris Sheyer, 17 Jeffrey Cir., Dayton, N.J. 08810; Christopher Symanski, 19 Fela Dr., Old Bridge, N.J. 08857; Gary Schober, 3 Price Dr., Edison, N.J. 08817

[21] Appl. No.: 08/696,230

[22] Filed: Aug. 13, 1996

[51] Int. Cl.$^6$ ............... H04B 17/00; H04Q 1/20
[52] U.S. Cl. ............... 375/224; 455/115
[58] Field of Search ............... 375/224; 455/115, 455/226.1; 324/639, 642; 343/703

[56] References Cited

U.S. PATENT DOCUMENTS

| | | | |
|---|---|---|---|
| 3,721,958 | 3/1973 | Dixon | 375/224 |
| 3,875,500 | 4/1975 | Fletcher et al. | 375/224 |
| 3,906,174 | 9/1975 | Dotter, Jr. | 375/224 |
| 4,361,904 | 11/1982 | Matsumura | 375/224 |
| 5,309,477 | 5/1994 | Ishii | 375/224 |
| 5,548,820 | 8/1996 | Victorin | 455/67.4 |

*Primary Examiner*—Temesghen Ghebretinsae
*Attorney, Agent, or Firm*—Robert A. Green

[57] ABSTRACT

The system operates with a signal transmission/reception apparatus such as a receive antenna, or a coaxial system or the like, while the antenna is receiving information signals and it operates by injecting a low power pseudo-noise digital signal into the antenna and detecting reflected energy, the magnitude of which depends on the condition of the antenna. The reflected signal is processed and compared with the original test signal to produce a digital number representing the condition of the antenna. The digital number is compared with a table of numbers in a processor to determine the condition of the antenna.

6 Claims, 1 Drawing Sheet

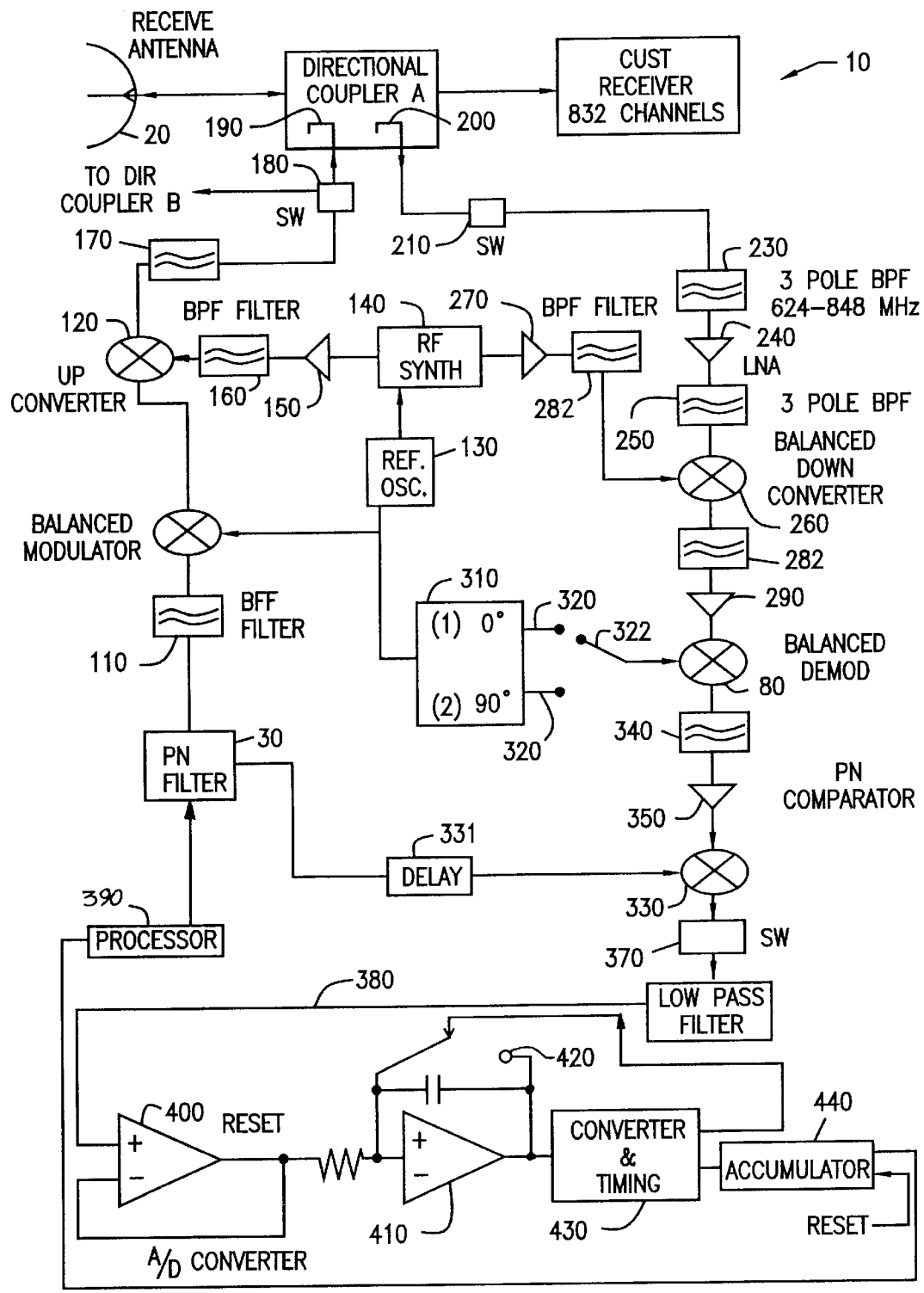

SYSTEM FOR TESTING SIGNAL TRANSMISSION/RECEPTION APPARATUS

BACKGROUND OF THE INVENTION

The present day extensive use of wireless communications, for example with cellular telephones, presents new problems in system maintenance. With the large number of antennas necessary to meet the present and growing demand for coverage, even the routine inspection of antennas becomes costly and time consuming. Because of coverage needs, many antennas are placed in remote locations and in locations which are relatively difficult to access and this increases the difficulty for regular inspections needed for system maintenance.

Normally, antennas are impedance matched to the connected transmitter or receiver to provide maximum power transfer to and from the antenna. When an antenna is damaged it becomes mismatched and power is reflected from the connection. For a transmit antenna, power is reflected back to the transmitter. This reflected power is generally large and can be detected by special hardware to determine that the antenna is mismatched and possibly damaged.

For a receive antenna with a mismatch, the amount of power transferred to the receiver is reduced. Thus the receiver does not have a direct indication of its antenna's mismatch. Power can be transmitted to the receive antenna and the reflected power measured to determine a mismatch. However, up to the present time, because received communication signals have low power, the receiver would always have to shut off during the measurement process since the transmitted power of the measurement system would interfere with the low power received communication signals.

SUMMARY OF THE INVENTION

The present invention operates to detect the mismatch of a receiver's antenna while the antenna and the receiving system continue to operate and without interfering with the operation of the antenna and its associated receiver system. Briefly, the invention comprises injecting a low power, spread spectrum radio frequency, pseudo noise (digital) signal into the receive antenna while the receive antenna and the associated system continue to operate normally. The invention uses the noise-like properties of a spread spectrum digital test signal and the processing gain of a spread spectrum receiver to eliminate the interference with received mobile signals of varying signal amplitude.

In the system of the invention, if there is an impedance mismatch at the antenna, a portion of the input test signal is reflected by the antenna and detected and processed in a spread spectrum receiver which compares the reflected low level pseudo noise signal with the original pseudo noise test signal and calculates the signal strength of the reflected signal and estimates the voltage standing wave ratio. Energy that is received from mobile (rather than narrow band signals) stations is uncorrelated and consequently is ignored.

More specifically but still in general terms, a pseudo-noise test signal is processed and fed into a receive antenna to be tested for integrity. If the antenna has some kind of defect, a portion of the input signal is reflected from the antenna and processed to produce a number which is a measure of the state of the antenna. The processing of the reflected signal includes demodulation with a sine wave (which had been used to modulate the input signal) and this is processed in an analog integrator to generate an analog voltage which is converted to a digital number which is stored in a processor. This procedure is repeated several times to produce several digital numbers which are averaged in the processor.

The foregoing procedure is then repeated several times by demodulating the reflected signal with a sine wave which is ninety degrees out of phase with the original signal) and processing the result to provide analog voltages and corresponding digital numbers which are averaged in the processor. The processor further processes the two sets of numbers to provide a number which represents the condition of the antenna tested.

The principles of the invention also apply to coaxial cable systems or the like.

DESCRIPTION OF THE DRAWING

The single FIGURE is a block diagram of the system of the invention.

DESCRIPTION OF THE INVENTION

The system of the invention 10 includes a receive antenna 20 which is to be tested to determine its condition. In normal use of the system 10, telephone calls, for example, come through the air to the receive antenna and then they are transmitted through the air to receivers at various locations. The quality and respective signal strength of the calls received by the receive antenna depend on the condition of the antenna.

The system 10 includes a pseudo-noise (PN) generator 30, which is a spread spectrum generator whose output is at a relatively low signal amplitude. The PN signal has a wide bandwidth which covers several of the narrow band receiver's channels in order to minimize interference. The output of the PN generator has zero mean value and comprises a string of digital ones and zeros which extends over a wide band and with the zeros and ones equal in number in a reasonably long sample. The bit pattern also is sufficiently random so that it has a low correlation to most telephone signals.

This PN test signal is coupled to modulation circuitry 40 including a radio frequency (RF) oscillator 130 which provides the carrier sine wave, which is then used to convert the PN signal to radio frequency (RF). This modulated RF signal is coupled through a directional coupler 190 to the antenna 20 to be tested.

If there is some antenna imperfection and resultant signal mismatch, some of the injected PN test signal is reflected from the antenna. The reflected signal, is a portion of the original injected spread spectrum PN signal which has a very low energy level. Normal received signals, which are considered noise, are also mixed with the reflected PN signal but they have a considerably higher energy level than the PN signals. The signals and noise are coupled to a second directional coupler 200 and through filters 230 and 250 to a balanced down converter 260 to which the reference oscillator 130 is also coupled through a buffer 270 and filter 280.

The output of the balanced down converter 260 is coupled through a filter 282 and amplifier 290 to a balanced demodulator 80 to which is also connected a ninety degree coupler module 310 to which the output of the reference oscillator 130 is coupled. This provides a sine wave carrier to the module 310. At the output of the module 310 there is a first output 320 (1-zero degrees) from which the sine of the carrier signal can be obtained and there is a second output 321 (Q-ninety degrees) from which the cosine of the carrier signal can be obtained. A switch 323 is adapted to be connected to each of the outputs 320 and 321 separately and the switch 323 is connected to the demodulator 80.

The demodulator 80 is coupled to a PN comparator 330 to which the PN generator 30 is also coupled, through a delay circuit 331, if necessary. The PN comparator 330 is coupled through a switch circuit 370 to a low pass filter 371 and then to an analog-to-digital (A/D) converter module 380 which includes a buffer 400, an integrate-and-dump module 410 (from which analog voltages are generated) and a converter and timing module 430. The output of module 380 is coupled to an accumulator 440 which is provided in the processor 390. The processor also includes means for low-pass filtering the numbers generated in module 380 and processing these numbers to provide the VSWR for the antenna 20.

The circuit elements 400, 410, 420 and 430 are embodied in a single module MAX 132 made by MAXIM.

In operation of the system 10, if antenna 20 is defective in any way, a portion of the input PN test signal is reflected back to the directional coupler 200 along with noise. The noise is primarily the signals native to the communication system which is to be rejected or filtered out. The noise signals may be telephone calls. The reflected PN signal and noise are fed to the balanced down converter 260 where they are demodulated and mixed with the output of the reference oscillator 130.

The signal and noise are fed to the balanced demodulator 80 where they are coupled first with the zero degree output of the module 310 on lead 320. The result of this demodulation is fed to the PN comparator 330 to which the output of the PN generator 30 is also fed. At this point, the bandwidth of the noise is spread and the bandwidth of the signal is reduced. The low pass filter reduces the amount of noise that enters the following circuitry in which the noise is further reduced and the signal is increased.

The output of the PN comparator 330 is fed through a switch 370 and low pass filter 371 to the A/D converter 380. The signal is integrated in module 410 to produce an analog voltage which is converted to a digital number in converter module 430. This conversion procedure continues for a period of time to produce a plurality of digital numbers which are averaged by the processor to produce a single digital number.

The switch 323 is then moved to the Q position and the above-described process is repeated to produce a second group of digital numbers which are averaged to produce a single digital number. The processor processes the two numbers to provide a VSWR for the antenna as a measure of its condition. The processor performs the following operations. It calculates the vector magnitude of the two orthogonal digital numbers generated by the system to provide the final correlation value which represents the amount of reflected test signal and this is a measure of the VSWR.

With respect to the noise in the system, the low pass filter 371 passes the signal but discards the noise. Then the signal is accumulated as described above but any noise present is not accumulated because of sign changes. Over a long period of time, the noise tends to charge to zero.

An important aspect of the invention is the use of both analog and digital processing of the reflected signals which permits correlation of a small signal with low signal to noise ratio and a long correlation length.

To summarize the principles of the invention, the processing gain of the receiver of the signal reflected from the antenna is achieved by a technique of analog and digital correlation of the reflected PN energy (plus any interference) against the transmitted and known PN sequence, integrating the correlation result over a relatively long period of time. The accumulation in the processor is a continuation of the low pass filtering. The noise is rejected because it has been spread across a wide frequency range and has little energy in the narrow band passed by the low pass filter. If the correlated signal exceeds a preset threshold of acceptable VSWR stored in a processor, then an alarm may be issued.

This unique technique of analog and digital correlation of reflected energy with transmitted energy allows monitoring of antenna systems without shutting off received signals normally handled by the antenna. The system operates over interference levels as strong as −20 dB while requiring stimulus levels of PN signals of only −80 dB. This low power stimulus permits the antenna monitor to operate within recommended base station system levels and it provides quick response in the event that an antenna is damaged by ice or the like and becomes electrically defective.

The theory underlying the present invention is as follows. As noted above, until the time of the present invention, the receiver in a telephone communication system would always have to be shut off during the antenna measurement process, since the transmitted power would interfere with the low power received signals. The present invention overcomes the problem of detecting the mismatch of a receiver's antenna without interfering with the operation of the antenna. It is this unobtrusive monitoring of antenna mismatch that characterizes the invention. The invention uses the noise-like properties of a spread spectrum signal, to avoid interfering with weak mobile signals, and the processing gain of a spread spectrum receiver to eliminate the interference normally associated with mismatch detection methods that rely on reflected power.

The voltage standing wave ration (VSWR) is a standard measure of reflected power in an antenna due to impedance mismatch as follows:

$$VSWR = \frac{1 + |\Gamma|}{1 - |\Gamma|}$$

where Γ the voltage reflection coefficient is the ratio of the reflected voltage wave to the incident voltage wave (both of which are taken to be phasers). The incident wave is considered to enter a device and the reflected wave travels in the opposite direction. The sum of the incident and reflected voltage waves is the actual voltage at any point.

The reflected signal from antenna 20 is extremely weak. At the antenna, it can be as low as 60dB below the signals intended for the receiver. Also, the phase of the radio frequency (RF) carrier has changed. An incoherent detection system is used in practising the invention since phase locking would be impossible with a signal to noise ratio (S/N) −60 dB. To overcome the inability to use phase lock techniques, a unique two part quasi-quadrature demodulation process is employed.

It is noted that the principles of the invention may be applied to other signal transmission apparatus than receive antennas, for example coaxial transmission systems.

What is claimed is:

1. A system for testing signal transmission apparatus comprising
    a signal transmission means to be tested,
    a source of a pseudo-noise test signal coupled to said signal transmission means,
    means for adjusting the frequency of said test signal prior to its being fed into said signal transmission means, means coupled to said signal transmission means for receiving a reflected portion of said test signal reflected from said signal transmission means, a circuit module having an input terminal at which an oscillator sine wave is received, said circuit module having first and second output terminals at the first of which said sine wave is present and at the second of which the quadrature of said sine wave is present, a demodulator module to which said reflected test signal is coupled and to which said output terminals of said circuit module are separately connectible whereby a first demodulation operation takes place with said reflected signal and said sine wave and a second demodulation operation takes place with said reflected signal and the quadrature of said sine wave, each demodulation operation producing analog signals representative of the condition of said signal transmission means, an analog to digital converter receiving said analog signals and converting them to digital signals, and correlation means receiving said digital signals and comparing them with a table of values representing normal operation of said signal transmission means.

2. The system defined in claim 1 including means, ahead of said correlation means, processing sets of in-phase signals and quadrature phase signals before comparing them with said table of values.

3. The system defined in claim 1 wherein said test signal is a digital signal which has zero mean and is made up of approximately the same number of ones and zeros in a long digital data stream.

4. The system defined in claim 1 and including a modulator circuit and reference oscillator and a converter coupled together and receiving said test signal and converting the frequency of the test signal to radio frequency.

5. The system defined in claim 4 and including (1) a converter for lowering the frequency of a signal reflected from said signal transmission means and (2) a signal comparator, an analog-to-digital converter coupled to said comparator, and a processor coupled to said analog-to-digital converter for receiving and processing the digital output of said analog-to-digital converter and comparing it to a table of values therein corresponding to normal or abnormal operation of said signal transmission means.

6. The system defined in claim 5 and including said processor that receives and processes a plurality of output signals derived from said analog to digital converter, said signal being sampled at different times before they are compared to a table of values therein corresponding to normal or abnormal operation of said signal transmission means.

* * * * *